United States Patent
Aust (10) Patent No.: US 11,168,509 B2
(45) Date of Patent: Nov. 9, 2021

(54) DOORFRAME PROTECTION DEVICE

(71) Applicant: Ehmke Manufacturing Company, Inc., Philadelphia, PA (US)

(72) Inventor: Glenn A. Aust, Fairless Hills, PA (US)

(73) Assignee: Ehmke Manufacturing Company, Inc., Philadelphia, PA (US)

( * ) Notice: Subject to any disclaimer, the term of this patent is extended or adjusted under 35 U.S.C. 154(b) by 248 days.

(21) Appl. No.: 16/381,526

(22) Filed: Apr. 11, 2019

(65) Prior Publication Data
US 2019/0316407 A1     Oct. 17, 2019

Related U.S. Application Data

(60) Provisional application No. 62/656,038, filed on Apr. 11, 2018.

(51) Int. Cl.
| | | |
|---|---|---|
| *E06B 1/34* | (2006.01) | |
| *B64C 1/14* | (2006.01) | |
| *E06B 7/28* | (2006.01) | |
| *E04G 21/30* | (2006.01) | |
| *E04F 19/02* | (2006.01) | |
| *B64D 45/00* | (2006.01) | |

(52) U.S. Cl.
CPC .............. *E06B 1/34* (2013.01); *B64C 1/1461* (2013.01); *E04F 19/028* (2013.01); *E04G 21/30* (2013.01); *E06B 7/28* (2013.01); *B64D 45/00* (2013.01)

(58) Field of Classification Search
CPC ........... E06B 1/34; E06B 7/28; B64C 1/1461; B64D 45/00; E04G 21/30; E04F 19/026; E04F 19/028; Y10S 52/12

USPC ............. 52/244, 716.8, 717.01, 717.03
See application file for complete search history.

(56) References Cited

U.S. PATENT DOCUMENTS

| | | | | |
|---|---|---|---|---|
| 1,620,933 A * | 3/1927 | Wilcox | ..................... | E06B 1/34 52/717.01 |
| 3,318,061 A * | 5/1967 | Stentz | ................... | E04F 19/028 52/288.1 |
| 4,372,091 A * | 2/1983 | Brown | ...................... | E04B 2/46 52/592.6 |
| 4,677,790 A * | 7/1987 | Adell | .................... | B60R 13/043 49/462 |
| 4,768,320 A * | 9/1988 | Weller | .................... | E04G 21/30 52/211 |
| 5,799,443 A * | 9/1998 | Koeniguer | ................ | E06B 3/88 16/404 |
| 6,684,572 B2 * | 2/2004 | Homolka | .................. | E06B 1/34 49/462 |
| 6,829,863 B2 * | 12/2004 | Lovas | ....................... | E06B 1/34 52/211 |
| 7,007,988 B1 * | 3/2006 | Doyle | .................... | B60R 19/56 267/139 |

(Continued)

*Primary Examiner* — Brent W Herring
(74) *Attorney, Agent, or Firm* — Barley Snyder (57) ABSTRACT

A doorframe protection device comprises a shell and an insert disposed within the shell. The shell is formed of a resilient material and has an outer wall, a pair of sidewalls extending from the outer wall, and an arm extending from each of the sidewalls to a distal end opposite the outer wall. The distal ends of the arms are biased towards each other. A lanyard opening is disposed in the outer wall. The insert is formed of a pliable material has a main body shaped to conform to and cover an inside of the outer wall, the sidewalls, and the arms of the shell.

24 Claims, 12 Drawing Sheets

(56) References Cited

U.S. PATENT DOCUMENTS

| | | | | |
|---|---|---|---|---|
| 8,448,745 | B2* | 5/2013 | Crookston | E04G 21/3276 |
| | | | | 182/3 |
| 8,640,763 | B1* | 2/2014 | Laengle | E06B 1/34 |
| | | | | 160/351 |
| 9,027,629 | B1* | 5/2015 | Laengle | E06B 1/04 |
| | | | | 160/351 |
| 9,752,291 | B2* | 9/2017 | Michael | E01F 15/141 |
| 2001/0049909 | A1* | 12/2001 | Homolka | E06B 7/28 |
| | | | | 49/460 |
| 2005/0155291 | A1* | 7/2005 | Homolka | E06B 1/34 |
| | | | | 49/462 |
| 2012/0111068 | A1* | 5/2012 | Pasky | E05B 17/002 |
| | | | | 70/56 |
| 2018/0266167 | A1* | 9/2018 | Pinchot | E04F 19/028 |
| 2020/0284086 | A1* | 9/2020 | Volpe | E06B 5/025 |

* cited by examiner

DOORFRAME PROTECTION DEVICE

CROSS-REFERENCE TO RELATED APPLICATION

This application claims priority under 35 U.S.C. § 119 to U.S. Provisional Patent Application No. 62/656,038, filed Apr. 11, 2018.

FIELD OF THE INVENTION

The invention relates to a protection device and, more particularly, to a removable doorframe protection device.

BACKGROUND

In any environment where large and particularly heavy objects are being moved through openings, such as on a conveyor system or rollers or dollies, the risk of the object striking the opening is ever-present as the object is passed therethrough. This is especially true in shipping environments where large packages or containers are being conveyed through doorframes or other structural openings.

Although various types of protective devices have been used to protect the openings, in some environments even minor damage to the opening is particularly problematic. Additionally, in some environments there is a need to have temporary protection which must be removable from the opening once objects are loaded through the opening. For example, in the airfreight industry, large containers are typically loaded onto aircraft over roller systems through fuselage doors. The fuselage doors have pressure seals that must maintain cabin pressure during flight. Any damage to the doorframe or opening can potentially damage the seal and or render the door un-securable, thereby grounding the aircraft at significant expense to the carrier.

SUMMARY

A doorframe protection device comprises a shell and an insert disposed within the shell. The shell is formed of a resilient material and has an outer wall, a pair of sidewalls extending from the outer wall, and an arm extending from each of the sidewalls to a distal end opposite the outer wall. The distal ends of the arms are biased towards each other. A lanyard opening is disposed in the outer wall. The insert is formed of a pliable material has a main body shaped to conform to and cover an inside of the outer wall, the sidewalls, and the arms of the shell.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the invention will be described hereinafter in detail with reference to the attached drawings, wherein like reference numerals refer to the like elements. The invention may, however, be embodied in many different forms and should not be construed as being limited to the embodiments set forth herein; rather, these embodiments are provided so that the disclosure will convey the concept of the invention to those skilled in the art.

Figure 1:
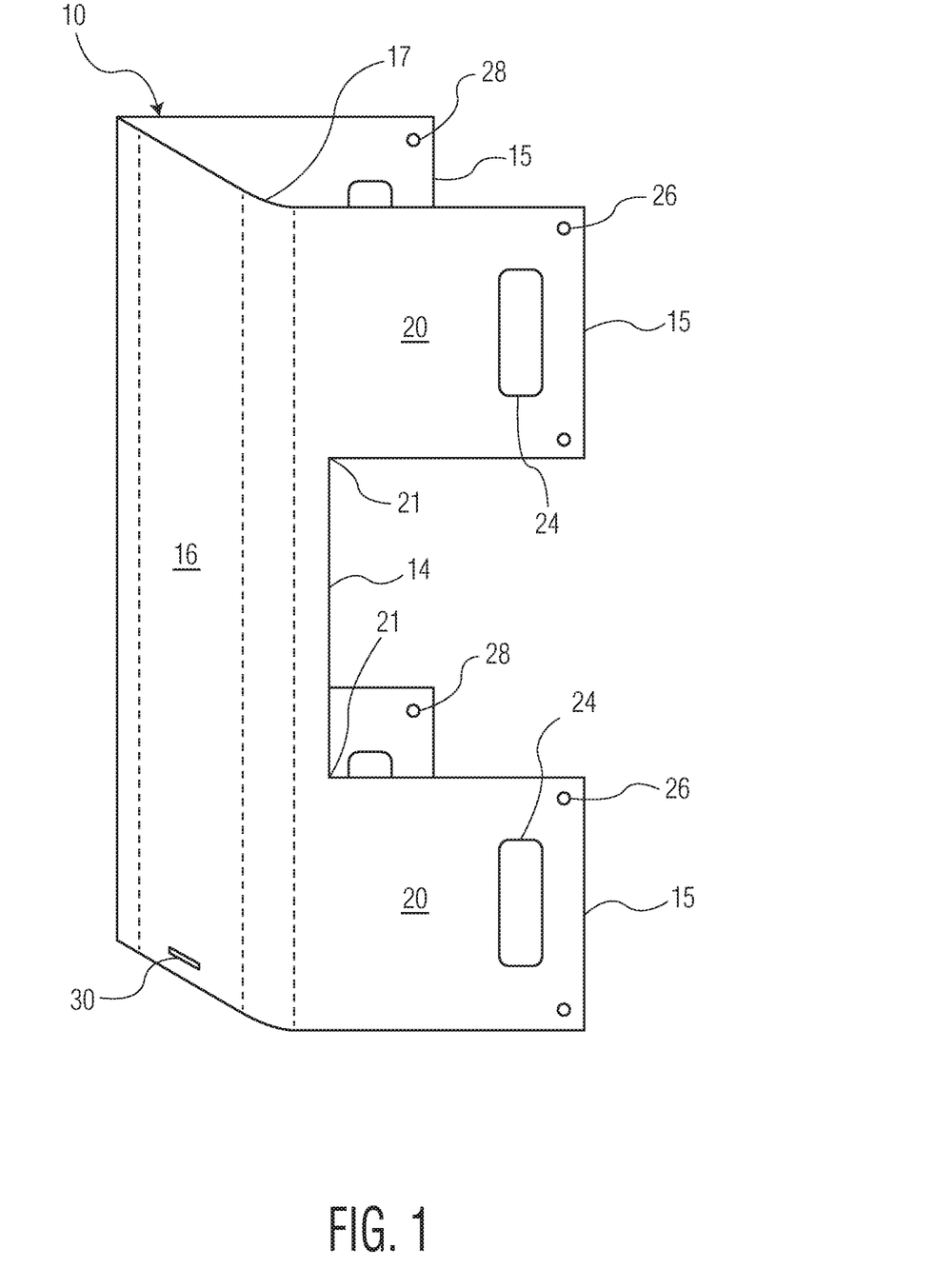
FIG. 1 is a right side view of a shell.
Figure 4:
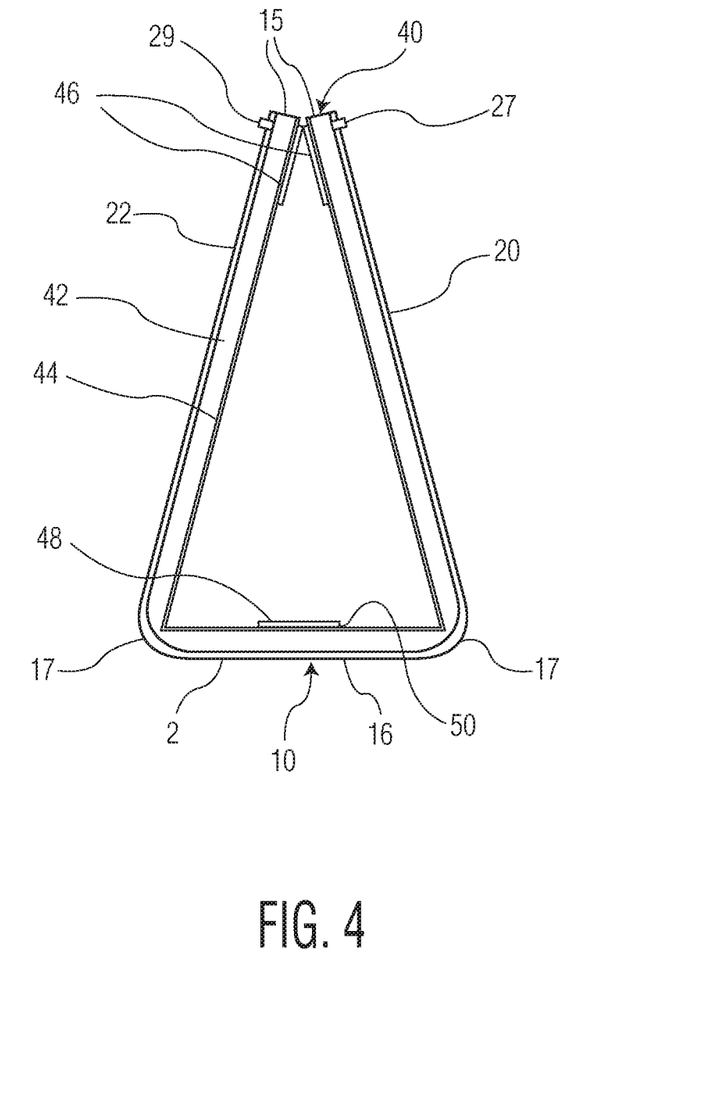
FIG. 4 is a top view of the shell of FIG. 1 with an insert.
Figure 7:
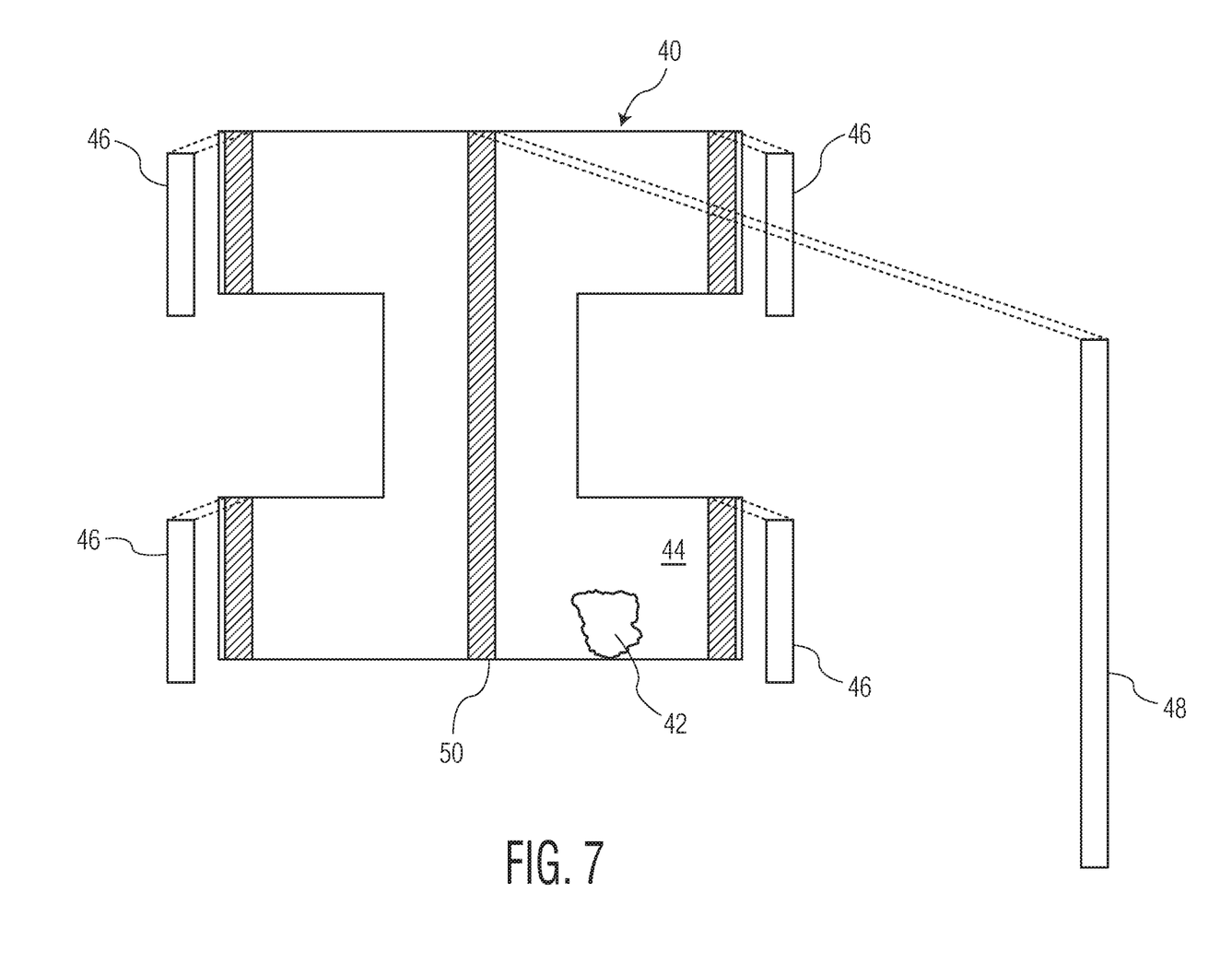
FIG. 7 is a side view of the insert of FIG. 4.

Referring first to FIGS. 1, 4, and 7, the doorframe protection device 2 has two major components, namely, a shell 10 and an insert 40. Each of these major components will now be described in greater detail with further reference to the embodiments and drawings. At the outset, it should be understood by those reasonably skilled in the art that while the invention is described with reference to embodiments of a doorframe protection device 2, such protection device may be applied to any structural or other openings through which objects pass in a way that they may strike and damage such openings.

The shell 10 is formed of a resilient material, for example a plastic material such as an acrylonitrile butadiene styrene (ABS) plastic stiffener. However, other suitable materials having similar properties may be substituted. Structurally, the shell 10 is a sheet material having a thickness which is shaped to have an outer wall 16, a pair of sidewalls 14, 18 each extending from opposing edges of the outer wall 16, and a pair of arms 20, 22 extending from each sidewall 14, 18 to a respective distal end 15. The shell 10 may have any of a range of possible colors and, in an embodiment, is an orange color.

The sidewalls 14, 18 and arms 20, 22 oppose each other and, as shown in FIG. 4, are angled and biased toward each other as they extend from the outer wall 16 to their respective distal ends 15 where they are closest to each other. A radius portion 17 is located between each of the sidewalls 14, 18 and the outer wall 16.

Figure 2:
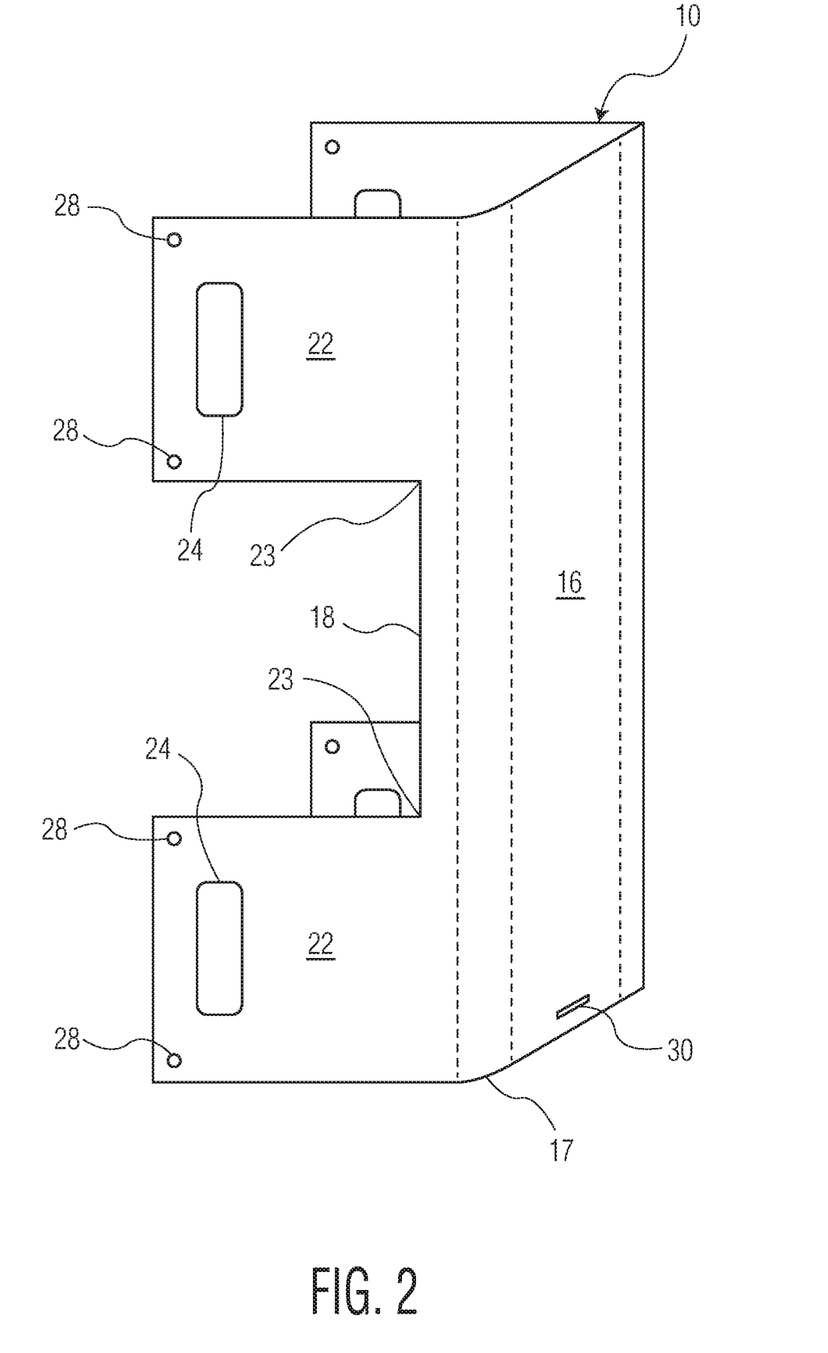
FIG. 2 is left side view of the shell of FIG. 1.

In the embodiment shown in FIGS. 1 and 2, a plurality of spaced apart arms 20, 22 may be positioned along each sidewall 14, 18. The pair of arms 20, 22 are spaced apart from each other in a direction parallel to a longitudinal direction of the outer wall 16. Other alternatives having different numbers of arms 20, 22 positioned along each sidewall 14 are anticipated and included within the scope of the invention. The arms 20, 22 and sidewalls 14 are resilient and biased such that distal ends 15 may be urged apart and resile towards each other upon release. The arms 20 each form an interior edge 21 with the sidewall 14 and the arms 22 each form an interior edge 23 with the sidewall 18. In the embodiment shown in FIGS. 1 and 2, the interior edges 21 and the interior edges 23 each defining an approximate right angle.

Figure 8:
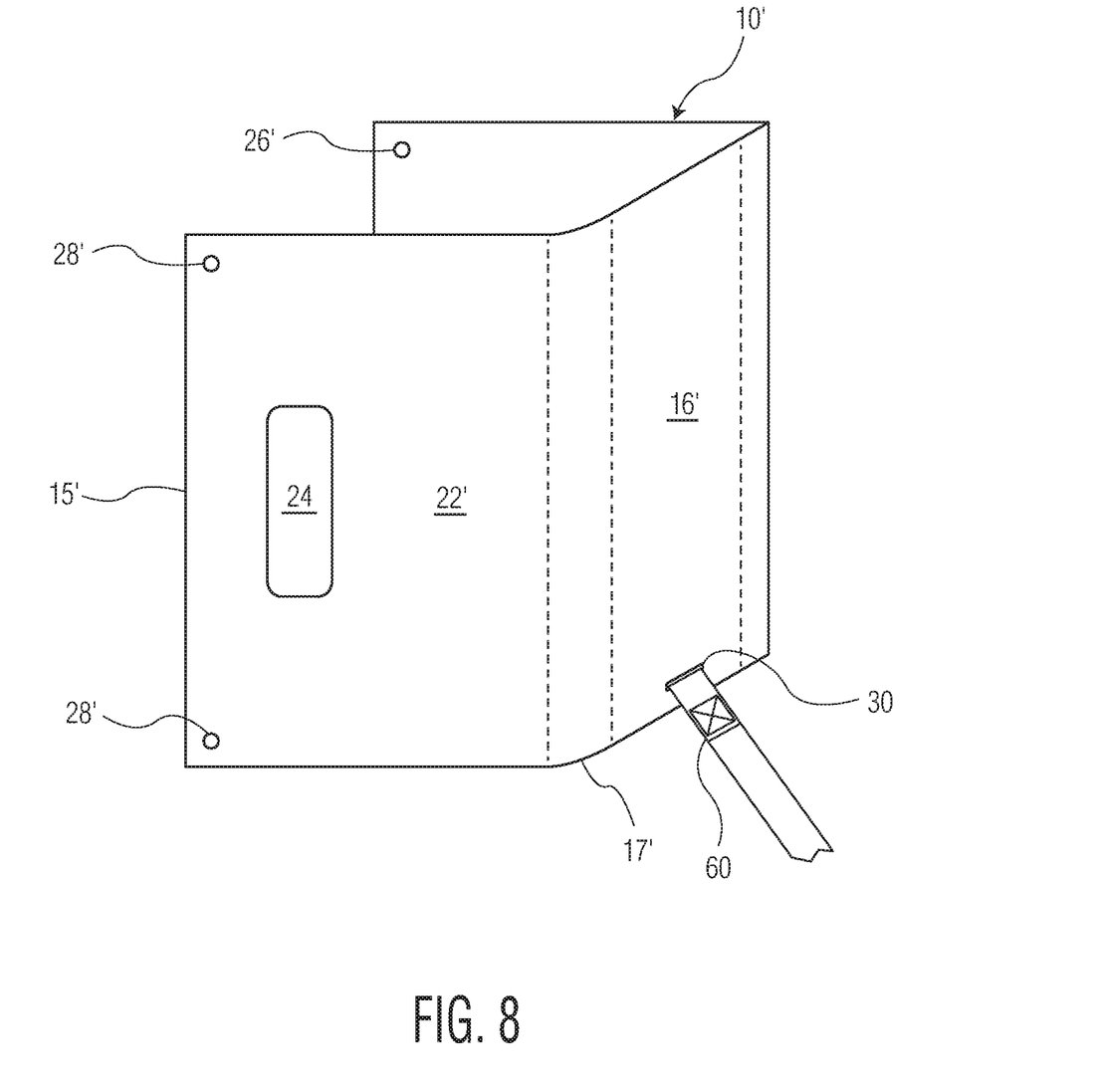
FIG. 8 is a side view of an alternate shell.

A shell 10' according to another embodiment is shown in FIG. 8; the shell 10' has like components labeled with like prime reference numbers and differs only in the arms 20', 22', which are dimensioned to extend along the entire length of each sidewall 14, 18.

Figure 11:
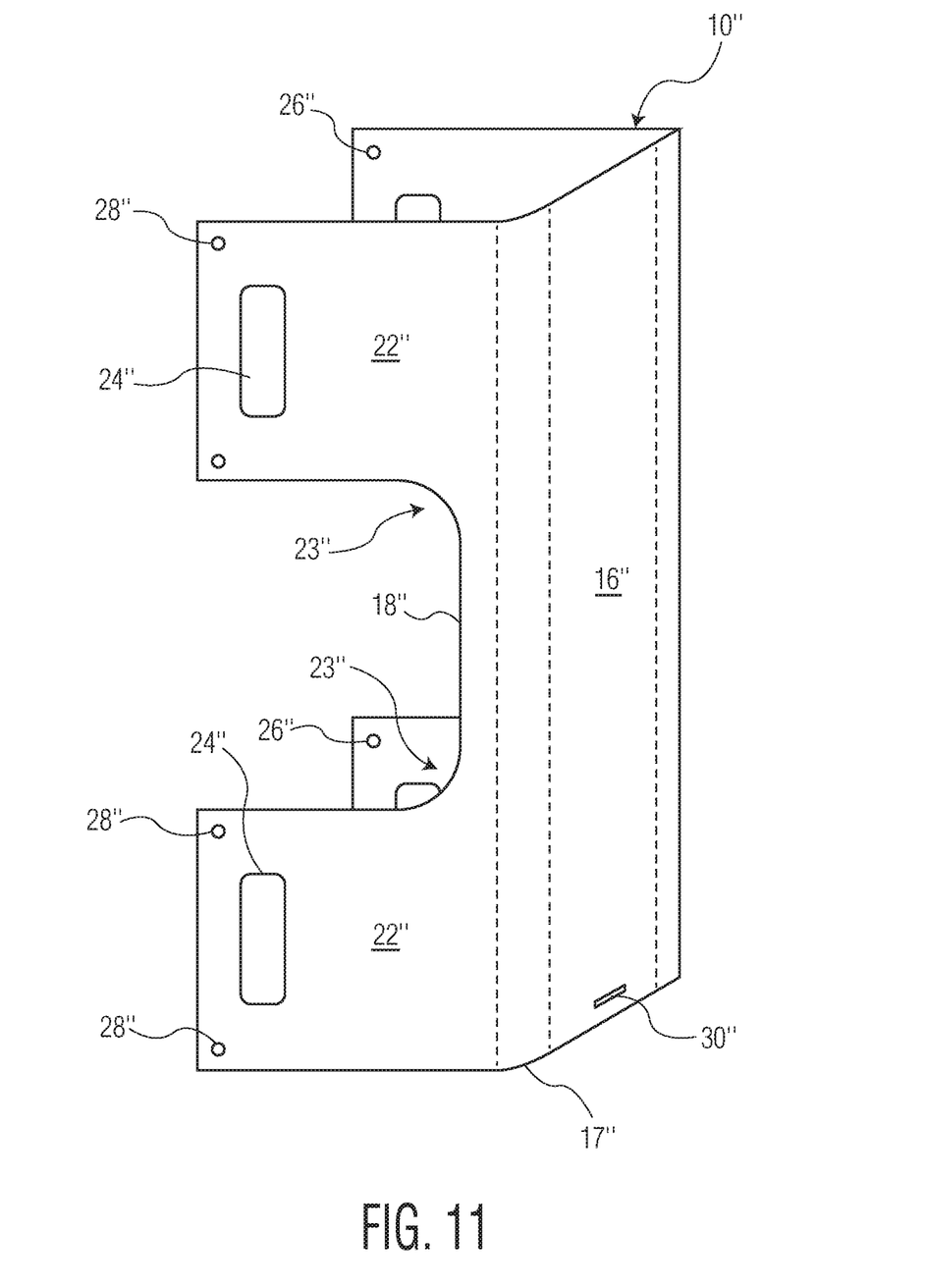
FIG. 11 is a side view of another alternate shell.

A shell 10" according to another embodiment is shown in FIG. 11. The shell 10" has like components labeled with like prime reference numbers and differs only in the interior edges 21", 23" of the arms 20", 22". In the embodiment shown in FIG. 11, the interior edges 21", 23" have a curved shape at the connection with the sidewalls 14", 18". The curved shape of the interior edges 21", 23" limits stress during resilient bending of the arms 20", 22".

Handle openings 24 are formed in each arm 20, 22 near respective distal ends 15. The handle openings 24 in the shown embodiments are shaped to be rectangular, however any shape dimensioned to allow fingers to pass there through to grab the arm 20, 22 may be used. Here the rectangular dimension is suitable for receiving four fingers, however, smaller dimensions allowing for fewer fingers may be used. In another embodiment, the handle openings 24 may be omitted. Insert fastener openings 26, 28 are located near the distal ends 15 to receive suitable fasteners 27, 29 such as threaded binding posts for securing the insert 40 to the shell 10.

Figure 3:
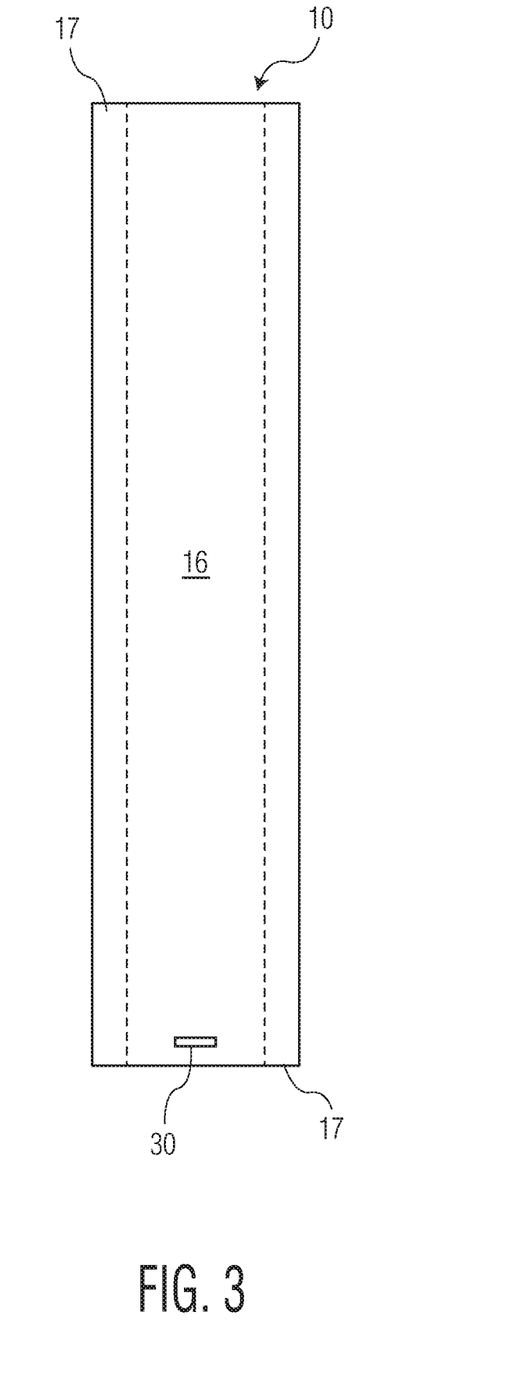
FIG. 3 is a rear view of the shell of FIG. 1.
Figure 5:
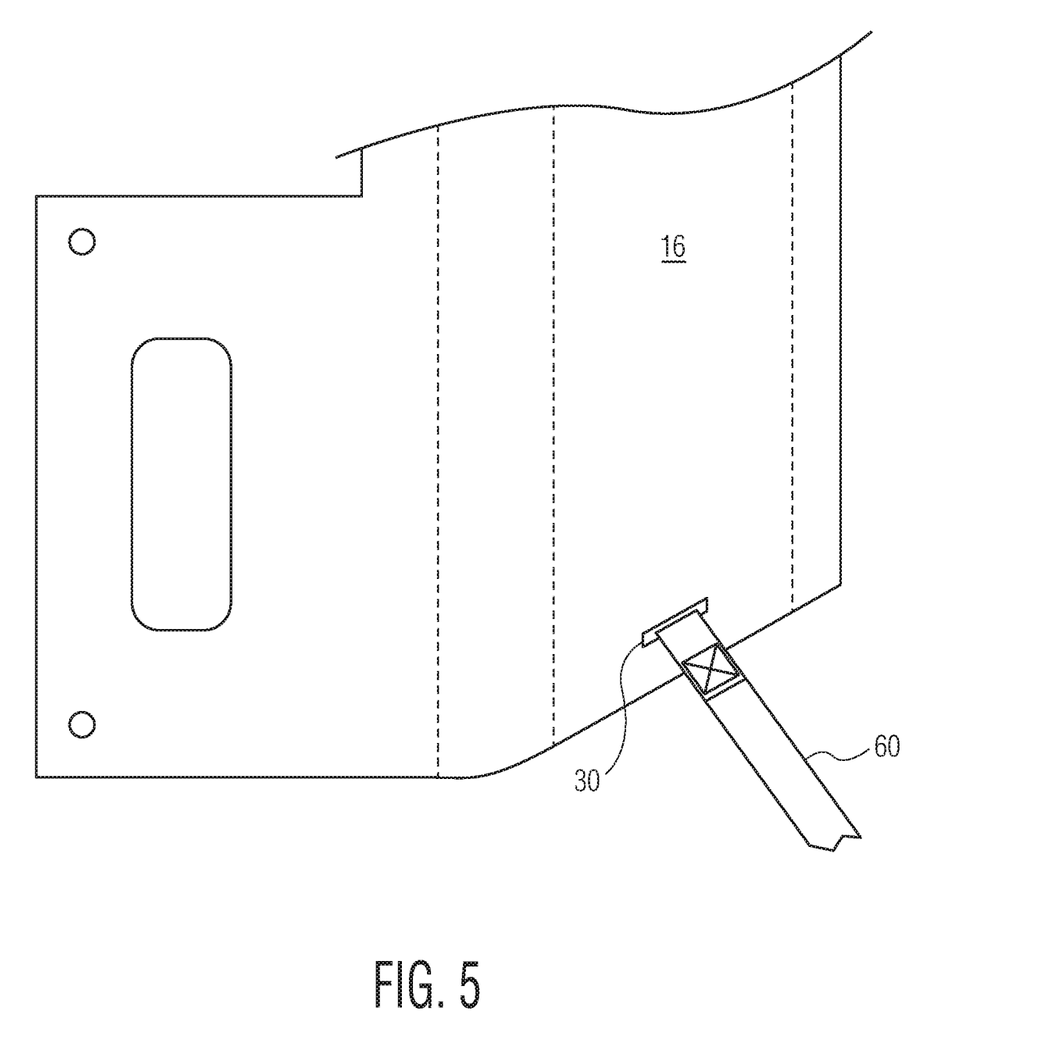
FIG. 5 is a detail side view of the shell of FIG. 1 showing a lanyard inserted.

The outer wall 16 is dimensioned to be slightly wider than the opening wall to be protected and it extends between the sidewalls 14. A lanyard opening 30 shown in FIG. 5, is formed in the outer wall 16 near one of its edges. The lanyard opening 30 is suitably dimensioned to receive a lanyard 60 having a rectangular cross-section or other cross-section such as circular or oval. The lanyard opening 30 is disposed adjacent a bottom of the outer wall 16 in a vertical orientation of the shell 10 as shown in FIGS. 1-3.

The insert 40 will now be described in greater detail. Referring to FIGS. 4 and 7, the insert 40 is formed of a pliable material having a main body 42 formed of a foam, for example, a polyurethane ester foam which is covered by a cover 44 formed of a heavy duty abrasion resistant material such as vinyl coated cloth. The main body 42 is shaped and dimensioned to conform to and cover the inside of the shell 10. Therefore, in this embodiment the insert 40 covers and mirrors the inside of the shells outer wall 16, sidewalls 14, and arms 20, 22, including the shape of the interior edges 21, 23.

As shown in FIGS. 4 and 7, a nylon back pad 48 is adhered to the inside of the insert 40 aligned with the outer wall 16. A plurality of gripping pads 46 are disposed on the inside of the insert 40 near the distal ends 15 of each arm 20. Both the nylon back pad 48 and the gripping pads 46 may be removably attached to the insert 40 by hook and loop fasteners 50 or other suitable fasteners. The gripping pads 46 may be made of multiple layers of materials best suited for gripping the material of the opening wall to be protected. Suitable materials include rubber or nylon. It should be understood that various material gripping pads 46 any be positioned in various ones of the locations on the respective arms 20, 22 for best grip to the wall opening or doorframe being protected. For example, in one embodiment, two of these gripping pads 46 are formed of rubber while the other two are formed of nylon for gripping the outer and inner surfaces of an airplane fuselage around a doorframe wall. Insert fasteners 27, 29 such as threaded binding posts located near the distal ends 15, pass through insert fastener openings 26, 28 in the shell 10 and at least a portion of the insert 40 to fasten the insert 40 to the shell 10.

Figure 9:
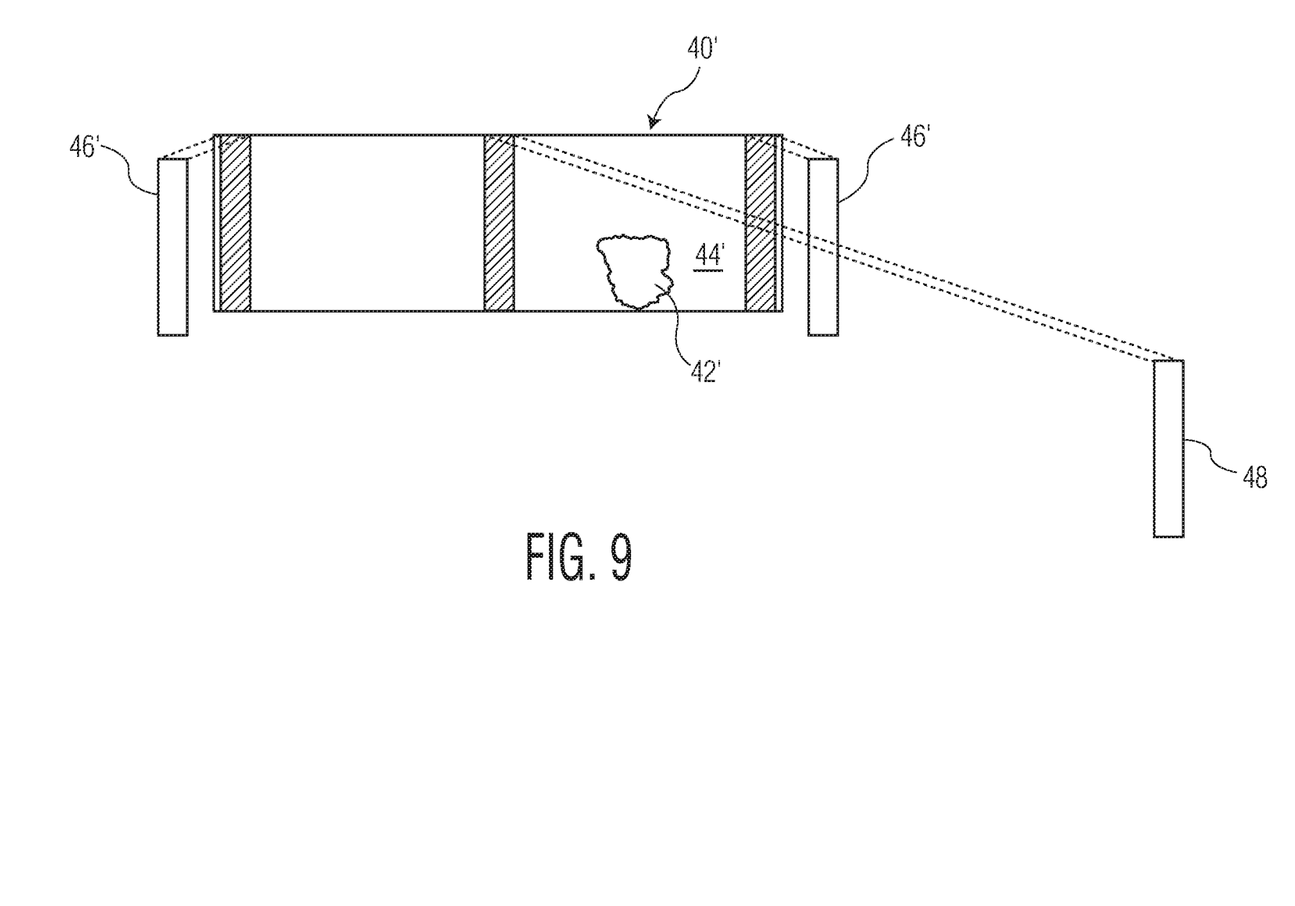
FIG. 9 is a side view of an alternate insert for use with the shell of FIG. 8.

The alternate insert 40' shown in FIG. 9 has like components labeled with like prime reference numbers and differs only in the number of arms that conform to arm 20', 22' of the shell 10'.

Figure 12:
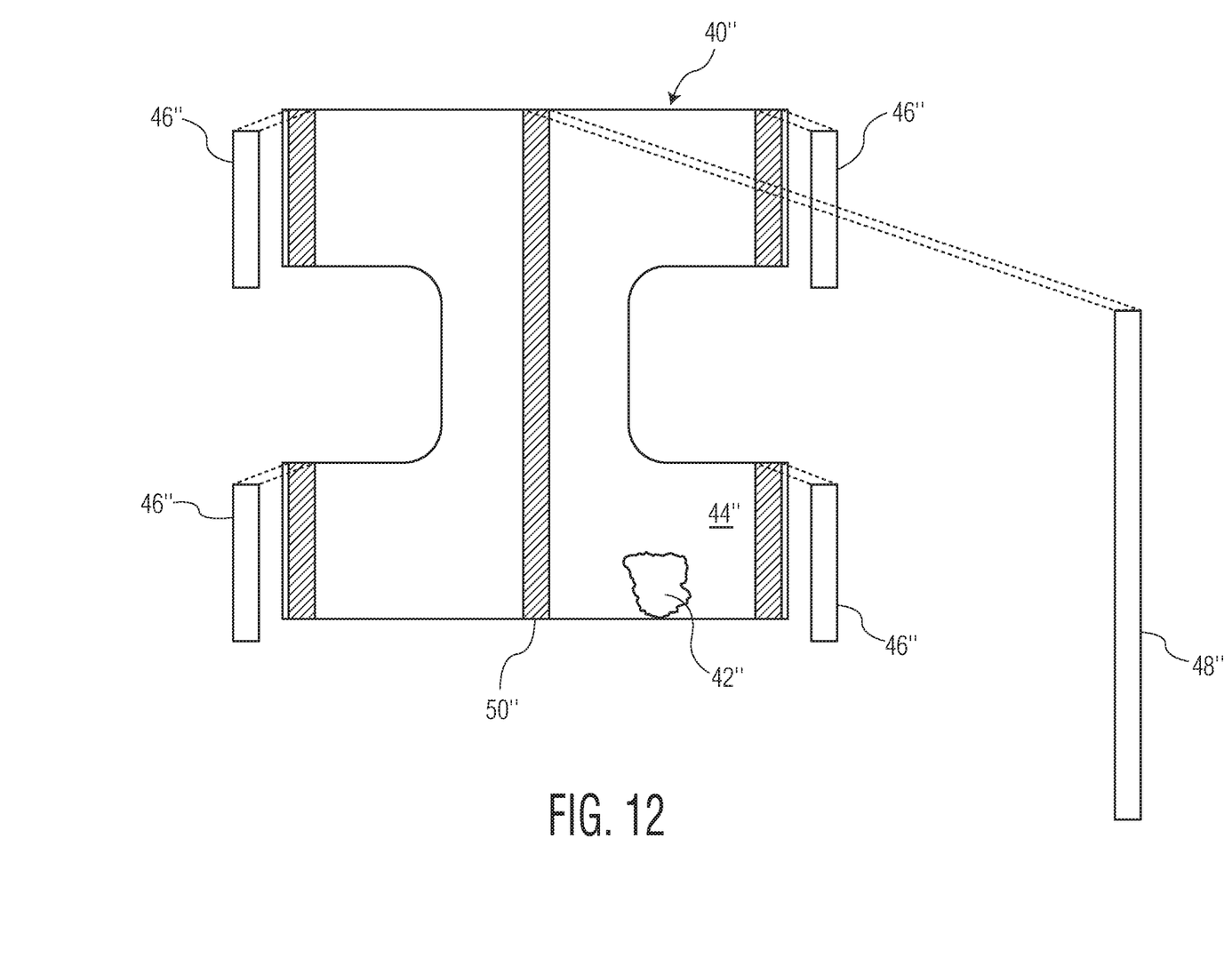
FIG. 12 is a side view of another alternate insert for use with the shell of FIG. 11.

An insert 40" according to another embodiment is shown in FIG. 12, and has like components labeled with like prime reference numbers. The insert 40" differs only in that the shape of the main body 42" corresponds to the curved shape of the interior edges 21", 23" of the shell 10" shown in FIG. 11.

Figure 6:
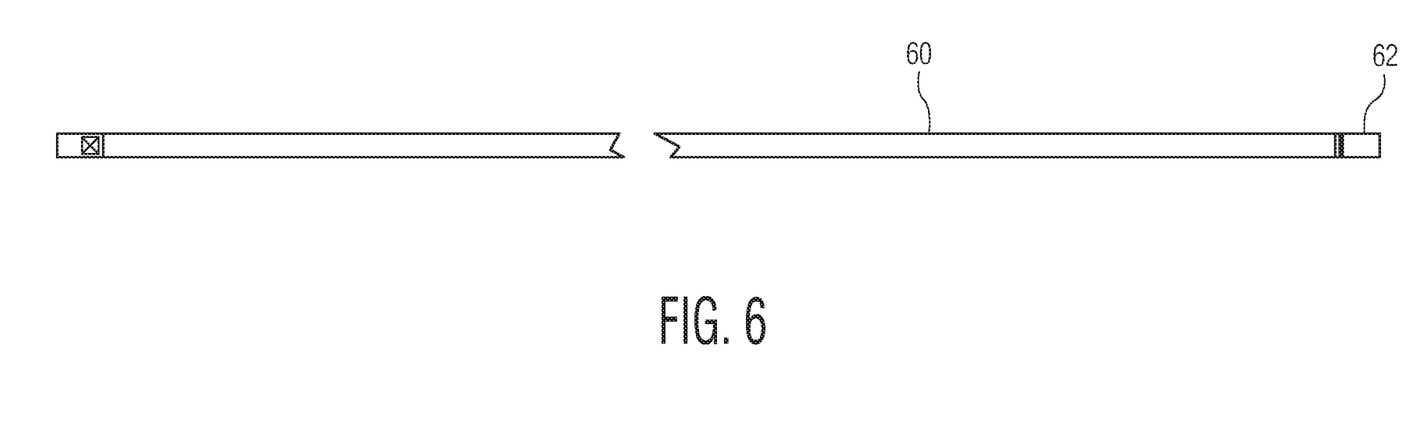
FIG. 6 is top view of the lanyard.
Figure 10:
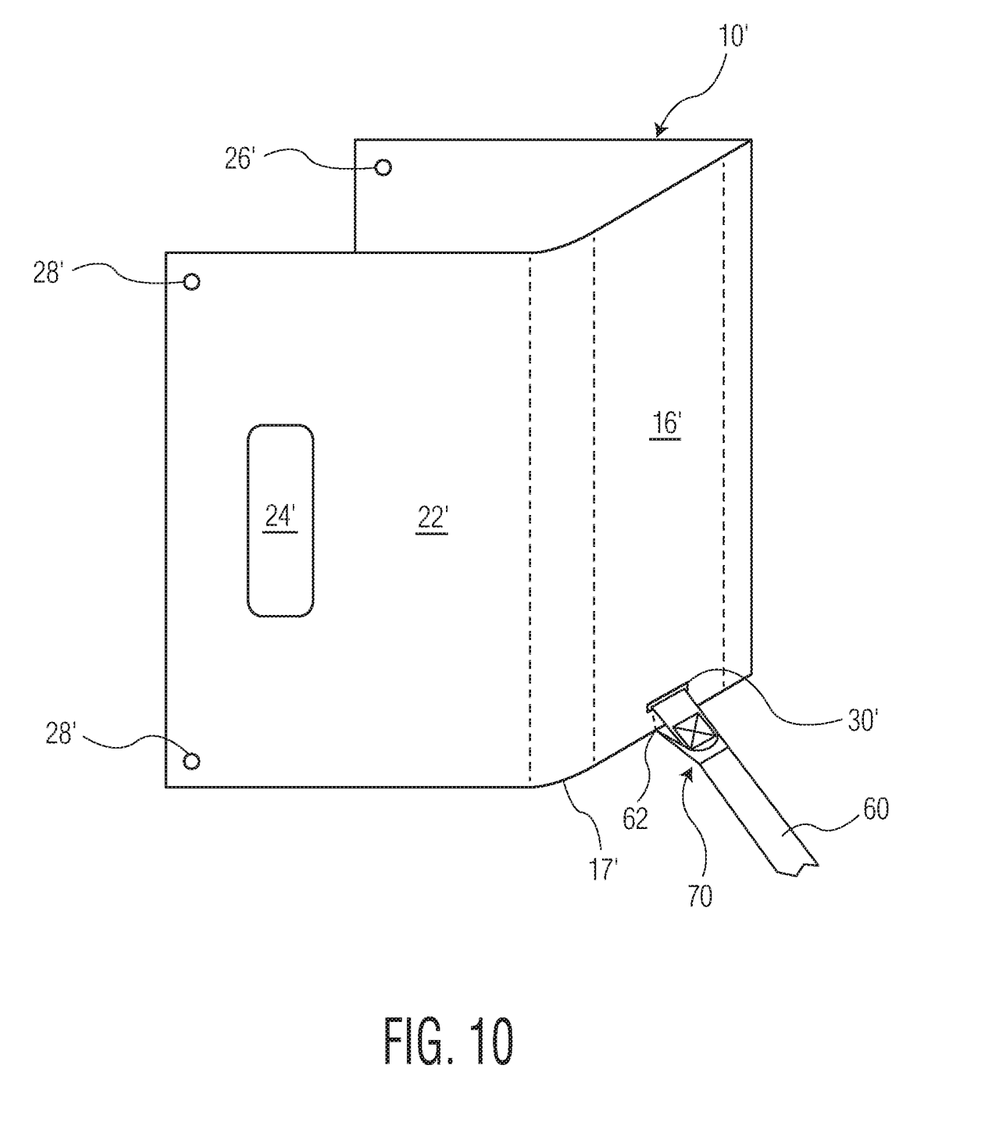
FIG. 10 is a detail side view of the alternate shell of FIG. 8 with an alternate lanyard attachment.

A lanyard 60, shown in FIG. 6, is formed of a strap like material, for example a nylon webbing having a rectangular cross-section. The lanyard 60 is attached to the shell 10 through the lanyard opening 30 as shown in FIG. 5 and is stitched together or otherwise attached. An opposite end of the lanyard 60 is formed with a loop 62 for receiving a carabineer 70. In another embodiment shown in FIG. 10, the loop 62 of the lanyard 60 is fed through the lanyard opening 30' and the carabineer 70 is attached to the loop 62, with the lanyard 60 extending through the carabineer 70 to create a loop attaching the lanyard 60 to the shell 10' at the lanyard opening 30'.

In assembly, the insert 40 is formed by applying the cover 44 over the main body 42. The gripping pads 46 and back pad 48 are then applied to the cover 44 by hook and loop fasteners 50 or other suitable fasteners. The insert 40 is then attached to the shell 10 with insert fasteners 27, 29 at the insert fastener openings 26, 28.

In use, with the insert 40 attached to the shell 10, an operator positioned behind the outer wall 16 grabs each arm 20, 22 through the handle openings 24 and urges the distal ends 15 apart by pulling at the handle openings 24. The operator then positions each of the separated distal ends 15 on opposite sides of the doorframe or opening wall and the arms 20, 22 resile back toward each other. The gripping pads 46 grip the wall of the opening, positioning the doorframe protection device 2 such that the outer wall 16 is oriented with the lanyard opening 30 at the bottom of the shell 10 in the vertical direction. The outer wall 16 acts as a protective wall against objects striking the doorframe or opening. Additionally, each radius portion 17 acts as a protective surface. Gripping pads 46 also grip the walls of the opening to provide a static frictional force that prevents the doorframe protection device 2 from sliding down the doorframe. The back pad 48 protects the edge of the doorframe opening wall.

The operator also attaches the lanyard 60 to a conveyor system or other device used to move an object through the opening by using a carabineer 70 passing through the loop 62 and attached to the conveyor system. The conveyer system is temporarily positioned next to the opening, such as an aircraft door. After moving the object through the opening, if the operator inadvertently fails to remove the doorframe protection device 2 from the doorframe, it therefore will be pulled from the doorframe by a pulling force imparted via the lanyard 60 at the bottom of the shell 10 and the doorframe protection device 2 as the conveyor system is backed away from the door before closure.

What is claimed is:

1. A doorframe protection device, comprising:
   a shell formed of a resilient material and having an outer wall, a pair of sidewalls extending from the outer wall, and an arm extending from each of the sidewalls to a distal end opposite the outer wall, the distal ends of the arms are biased towards each other, a lanyard opening is disposed in the outer wall; and
   an insert formed of a pliable material and disposed within the shell, the insert having a main body shaped to conform to and cover an inside of the outer wall, the sidewalls, and the arms of the shell, the main body of the insert is covered by a cover.

2. The doorframe protection device of claim 1, further comprising a lanyard attached to the lanyard opening.

3. The doorframe protection device of claim 2, wherein the lanyard has a loop at an end receiving a carabineer.

4. The doorframe protection device of claim 1, wherein the shell has a radius portion between each of the sidewalls and the outer wall.

5. The doorframe protection device of claim 1, wherein each of the arms has a handle opening disposed adjacent the distal end.

6. The doorframe protection device of claim 1, wherein only a single arm extends from each of the sidewalls to the distal end.

7. The doorframe protection device of claim 1, wherein a pair of arms extend from each of the sidewalls to the distal end, the pair of arms on each sidewall are spaced apart from each other in a direction parallel to a longitudinal direction of the outer wall.

8. The doorframe protection device of claim 7, wherein each of the arms has a handle opening disposed adjacent the distal end.

9. The doorframe protection device of claim 8, wherein the pair of arms on each sidewall each form an interior edge with the sidewall, the interior edge defining an approximate right angle.

10. The doorframe protection device of claim 8, wherein the pair of arms on each sidewall each form an interior edge with the sidewall, the interior edge having a curved shape.

11. The doorframe protection device of claim 1, wherein the pliable material of the main body is formed of a foam and the cover is formed of an abrasion-resistant material.

12. The doorframe protection device of claim 1, wherein the shell has a plurality of insert fastener openings disposed adjacent the distal ends of the arms.

13. The doorframe protection device of claim 12, wherein a plurality of insert fasteners secure the insert to the shell through the insert fastener openings.

14. The doorframe protection device of claim 1, wherein the insert has a back pad adhered to an inside of the insert aligned with the outer wall.

15. The doorframe protection device of claim 14, wherein the insert has a plurality of gripping pads disposed on the inside of the insert adjacent the distal ends of the arms.

16. The doorframe protection device of claim 15, wherein the back pad and the plurality of gripping pads are removably attached to the insert.

17. The doorframe protection device of claim 15, wherein the back pad and the plurality of gripping pads are formed of rubber or nylon.

18. The doorframe protection device of claim 17, wherein the back pad and the plurality of gripping pads are adapted to abut and grip an opening wall to be protected by the doorframe protection device.

19. The doorframe protection device of claim 1, wherein the resilient material of the shell is a plastic material.

20. A doorframe protection device, comprising:
a shell formed of a resilient material and having an outer wall, a pair of sidewalls extending from the outer wall, and an arm extending from each of the sidewalls to a distal end opposite the outer wall, the distal ends of the arms are biased towards each other, a lanyard opening is disposed in the outer wall;
an insert formed of a pliable material and disposed within the shell, the insert having a main body shaped to conform to and cover an inside of the outer wall, the sidewalls, and the arms of the shell; and
a lanyard attached to the lanyard opening.

21. The doorframe protection device of claim 20, wherein the lanyard has a loop at an end receiving a carabineer.

22. A doorframe protection device, comprising:
a shell formed of a resilient material and having an outer wall, a pair of sidewalls extending from the outer wall, and an arm extending from each of the sidewalls to a distal end opposite the outer wall, the distal ends of the arms are biased towards each other, a lanyard opening is disposed in the outer wall; and
an insert formed of a pliable material and disposed within the shell, the insert having a main body shaped to conform to and cover an inside of the outer wall, the sidewalls, and the arms of the shell, the insert has a back pad adhered to an inside of the insert aligned with the outer wall, the insert has a plurality of gripping pads disposed on the inside of the insert adjacent the distal ends of the arms;
wherein the back pad and the plurality of gripping pads are formed of rubber or nylon.

23. The doorframe protection device of claim 22, wherein the back pad and the plurality of gripping pads are removably attached to the insert.

24. The doorframe protection device of claim 22, wherein the back pad and the plurality of gripping pads are adapted to abut and grip an opening wall to be protected by the doorframe protection device.

* * * * *